(12) United States Patent
Moss et al.

(10) Patent No.: US 10,946,898 B2
(45) Date of Patent: Mar. 16, 2021

(54) CLOSE COUPLED FOUR RAIL FRONT STRUCTURE SYSTEM TRANSFERRING COMPRESSIVE LOADS INTO A SINGLE CENTER TORSION/COMPRESSION MEMBER

(71) Applicant: GM GLOBAL TECHNOLOGY OPERATIONS LLC, Detroit, MI (US)

(72) Inventors: Edward D. Moss, Commerce Township, MI (US); Joshua Holder, Clinton Township, MI (US); Keith J. Saari, Macomb Township, MI (US); Mark J. McGuire, Amherstburg (CA); Peter M. Parlow, Columbus, MI (US); Robert M. Kielbik, Chesterfield Township, MI (US); Tadge J. Juechter, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 16/514,549

(22) Filed: Jul. 17, 2019

(65) Prior Publication Data
US 2021/0016836 A1    Jan. 21, 2021

(51) Int. Cl.
| B62D 29/00 | (2006.01) |
| B62D 21/15 | (2006.01) |
| B60K 5/00 | (2006.01) |
| B62D 21/04 | (2006.01) |
| B60R 16/08 | (2006.01) |
| B62D 27/06 | (2006.01) |
| B60K 11/00 | (2006.01) |
| B60H 1/00 | (2006.01) |

(52) U.S. Cl.
CPC .............. B62D 21/155 (2013.01); B60K 5/00 (2013.01); B60R 16/08 (2013.01); B62D 21/04 (2013.01);
(Continued)

(58) Field of Classification Search
CPC .... B62D 21/155; B62D 21/04; B62D 29/008; B62D 27/065; B60K 5/00; B60K 11/00;
(Continued)

(56) References Cited

U.S. PATENT DOCUMENTS

4,950,026 A * 8/1990 Emmons ................ B62D 21/06
296/203.01
5,660,428 A * 8/1997 Catlin .................... B62D 21/04
269/311
(Continued)

*Primary Examiner* — Pinel E Romain
(74) *Attorney, Agent, or Firm* — Quinn IP Law (57) ABSTRACT

A system for providing structural transmittal of force through a vehicle body of a mid-engine vehicle is provided. The system includes an elongated single member torsional box spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body. The system further includes four rails in a vehicle-forward position relative to the elongated single member torsional box, parallel to the longitudinal axis of the vehicle body, and offset from the elongated single member torsional box. The system further includes four diagonal support members, each diagonal support member being connected at a first end to one of the four rails and at a second end to the elongated single member torsional box.

16 Claims, 4 Drawing Sheets

(52) U.S. Cl.
CPC ......... *B62D 27/065* (2013.01); *B62D 29/008* (2013.01); *B60H 1/00407* (2013.01); *B60H 1/00571* (2013.01); *B60K 11/00* (2013.01); *B60K 2005/003* (2013.01)

(58) Field of Classification Search
CPC .............. B60K 2005/003; B60R 16/08; B60H 1/00407; B60H 1/00571
USPC ........................................ 296/187.03, 187.09
See application file for complete search history.

(56) References Cited

U.S. PATENT DOCUMENTS

| | | | |
|---|---|---|---|
| 5,788,322 A * | 8/1998 | Wolf .................... | B62D 25/088 296/181.4 |
| 6,742,808 B1 * | 6/2004 | Kosak .................... | B62D 21/11 280/781 |
| 7,201,433 B2 * | 4/2007 | Herntier ................ | B62D 21/152 296/187.03 |
| 9,216,768 B1 * | 12/2015 | Dressel ................ | B62D 25/082 |
| 9,592,856 B2 * | 3/2017 | Nakamura ............. | B62D 25/06 |
| 9,738,322 B2 * | 8/2017 | Matthiessen ........... | B62D 25/04 |
| 9,988,091 B2 * | 6/2018 | McConnell ........... | B62D 21/02 |
| 9,988,100 B2 * | 6/2018 | Kim ...................... | B62D 25/082 |
| 10,005,349 B2 * | 6/2018 | Baccouche ........... | B62D 25/087 |
| 10,086,875 B2 * | 10/2018 | Nishikawa ............ | B62D 21/155 |
| 10,150,509 B2 * | 12/2018 | McConnell ........... | B62D 21/155 |
| 10,286,963 B2 * | 5/2019 | Mildner ................ | B62D 27/023 |
| 2012/0175863 A1 * | 7/2012 | Theodore ............... | B62D 21/04 280/798 |
| 2013/0249244 A1 * | 9/2013 | Cassaday ................ | F41H 7/042 296/187.08 |
| 2016/0059904 A1 * | 3/2016 | Kerscher ................ | B62D 29/04 296/187.03 |
| 2016/0207570 A1 * | 7/2016 | Tanaka ...................... | B60G 3/20 |

* cited by examiner

CLOSE COUPLED FOUR RAIL FRONT STRUCTURE SYSTEM TRANSFERRING COMPRESSIVE LOADS INTO A SINGLE CENTER TORSION/COMPRESSION MEMBER

INTRODUCTION

The disclosure generally relates to a structural system for a convertible, mid-engine automobile.

A vehicle body includes a structural system useful for providing rigidity and force transmission through the body. The structural system includes a group of connected structural members which are frequently shaped tubular members, which can include a wide variety of cross-sectional shapes.

A structural system in a convertible vehicle is complex, in that structural members that are present in a roof of a standard coupe vehicle are absent in a convertible. Further, one does not typically want a majority of force transmission in a vehicle to go through the vehicle doors.

A structural system in a mid-engine automobile is complex. A mid-engine automobile includes an engine behind the passenger compartment. As a result, the area in front of the passenger compartment is an empty space, which can include, for example, a cargo area. Mid-engine vehicle configurations limit efficient transfer of front external loads into mid vehicle structural members. Whereas front-engine vehicles have a large mass of the engine in front of the passenger compartment through which to transmit force, the empty space in front of the passenger compartment in a mid-engine automobile poses complex issues in terms of structural force transmission.

SUMMARY

A system for providing structural transmittal of force through a vehicle body of a mid-engine vehicle is provided. The system includes an elongated single member torsional box spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body. The system further includes four rails in a vehicle-forward position relative to the elongated single member torsional box, parallel to the longitudinal axis of the vehicle body, and offset from the elongated single member torsional box. The system further includes four diagonal support members, each diagonal support member being connected at a respective first end to a respective one of the four rails and at a respective second end to the elongated single member torsional box.

In some embodiments, the four rails are each constructed with a relatively low strength aluminum, and the four diagonal support members are each constructed with a relatively high strength aluminum.

In some embodiments, the elongated single member torsional box includes a constant cross section along a longitudinal axis of the elongated single member torsional box.

In some embodiments, the diagonal support members are each oriented thirty degrees from the longitudinal axis of the vehicle body.

In some embodiments, the elongated single member torsional box includes four corners, and the diagonal support members are each connected at the second end to one of the corners of the elongated single member torsional box. In some embodiments, each of the corners of the elongated single member elongated box includes an elongated enclosed section running along an entire length of the single member torsional box.

In some embodiments, the elongated single member torsional box includes a closed polygonal cross-section. In some embodiments, the closed polygonal cross-section includes a rectangle cross-section. In some embodiments, a bottom surface of the elongated single member torsional box includes a removable panel. In some embodiments, the elongated single member torsional box includes a plurality of integrated clinch nuts configured to enable the removable panel to be attached to other components of the elongated single member torsional box. In some embodiments, the elongated single member torsional box includes cooling lines extending through the elongated single member torsional box.

According to one alternative embodiment, a system for providing structural transmittal of force through a vehicle body of a mid-engine vehicle is provided. The system includes an elongated single member torsional box including a closed rectangular cross-section and four corners. Each of the four corners includes an elongated enclosed section running along an entire length of the single member torsional box. The elongated single member torsional box spans a passenger compartment from a vehicle-forward portion of the passenger compartment to a vehicle-rearward portion of the passenger compartment, runs parallel to a longitudinal axis of the vehicle body, and is laterally centered upon a longitudinal centerline of the vehicle body. The system further includes four rails in a vehicle-forward position relative to the elongated single member torsional box, parallel to the longitudinal axis of the vehicle body, and offset from the elongated single member torsional box. The system further includes four diagonal support members, each diagonal support member being connected at a respective first end to a respective one of the four rails and at a respective second end to a respective one of the four corners of the elongated single member torsional box.

In some embodiments, the four rails are each constructed with a relatively low strength aluminum, and the four diagonal support members are each constructed with a relatively high strength aluminum.

In some embodiments, the elongated single member torsional box includes a constant cross section along a longitudinal axis of the elongated single member torsional box.

In some embodiments, the diagonal support members are each oriented thirty degrees from the longitudinal axis of the vehicle body.

According to one alternative embodiment, a method for providing structural transmittal of a frontal force through a vehicle body of a mid-engine vehicle is provided. The method includes receiving the frontal force to four rails in a vehicle-forward position, the rails being oriented parallel to a longitudinal axis of the vehicle body, transmitting the frontal force from the four rails to four diagonal support members located in a vehicle rearward position relative to the four rails, each diagonal support member being connected at a first end to one of the four rails and at a second end to an elongated single member torsional box, and transmitting the frontal force from the four diagonal support members to the elongated single member torsional box located in a vehicle rearward position relative to the four diagonal support members, the elongated single member torsional box spanning a passenger compartment from a vehicle-forward portion of the passenger compartment to a vehicle-rearward portion of the passenger compartment and being parallel to the longitudinal axis of the vehicle body and laterally centered upon a longitudinal centerline of the vehicle body.

The above features and advantages and other features and advantages of the present disclosure are readily apparent from the following detailed description of the best modes for carrying out the disclosure when taken in connection with the accompanying drawings.

DETAILED DESCRIPTION

A close coupled four rail front crush structure system is provided for a mid-engine vehicle. The system can be utilized in a mid-engine, convertible vehicle. According to one exemplary embodiment, the system includes a close coupled four rail system, including front upper and lower rails, both designed to maximize efficient transfer of front compression loads into an elongated single center torsional member. Both upper and lower rail systems may be positioned close to a vehicle centerline to minimize the angle of transition to the closed sections center tunnel. Additionally, the upper and lower rails may be designed in a horizontal plane such that the transition to the center tunnel member creates minimal vertical plane offset to ensure the transition of axial crush loads.

Four close coupled front rail members may each be joined to a low plan view angle diagonal structural element for efficient compressive load transfer into a single center torsion/compression structural member or single member torsional box. This single member torsional box can be described as a mid-vehicle tunnel dominant structure. This single member torsional box may sit between a driver seat and a passenger seat in the passenger compartment. A bottom surface of the single member torsional box can be flush or nearly flush with a bottom surface of the vehicle. In one embodiment, a bottom surface of the single member torsional box may be embodied as a flat panel and may be removeable, for example, with a plurality of fastening members, enabling maintenance service to components housed within the single member torsional box. The single member torsional box may, in some embodiments, be described as a singular, center torsional box structure, with a removable panel, augmented with continuous full-length closed section members at each corner to enable dual load carrying capability. In one embodiment, the single member torsional box can include a tunnel extrusion and/or stamping member with integrated clinch nuts.

In one embodiment, the four front rail members can be high integrity die castings made with low strength aluminum. In one embodiment, the four diagonal support members attached to the four front rail members can be extruded high strength aluminum. The four diagonal support members can be directly attached to four corners of the single member torsional box. Such a configuration may enable efficient transfer of load from front crush box, to front diagonals, and into the single member torsional box.

The front structure is an improvement over typical front structures for its configuration and efficiency in the method in which it transfers compressive load to the mid structure. The front crush structure and a back-up transition structure may be a combination of extrusions and castings (nodes) abbreviated as node-ex construction. The front crush zone extrusions may be constructed of crushable aluminum alloys, the diagonal structural elements may be high strength specialized 7000 series extrusions to facilitate the transfer of heavy compressive loads.

The single member torsional box may be dual purpose in load carrying capability; the large enclosed section providing high torsional rigidity, and the four corner box sections providing frontal compressive force strength. The large enclosed section may be additionally useful with its removable lower panel, for example, constructed with carbon fiber with an exemplary 28 attachments, ensuring torsional rigidity. The four corner box sections are useful in two exemplary ways; the upper sections are constructed with a single two cell extrusion with a connecting rib, the lower section constructed of an extrusion and a stamping with 14 embedded clinch nuts per tunnel side.

The system can include a high and low front rail system, combined with diagonal structural elements, aligned in a manner to transfer load into a single member torsional box with no vertical plane eccentricity.

Advantages of the disclosed system include improved open-air vehicle torsional stiffness, efficient distribution and mitigation of frontal force transmission loads, as well as, providing a higher priority of packaging real estate to occupants, powertrain systems, chassis systems, cooling systems, etc.

Typical vehicles include heat exchanger components located upon a front and center location in a vehicle. The disclosed four rail system may, in some embodiments, include a horizontal structural member spanning a front and center location between two top rails or two bottom rails. As a result, in some embodiments, radiators, condensers, charge air coolers, transmission coolers, etc., may be utilized outside of the font and center location, for example, in a dual outboard system where heat exchangers are moved in front of front wheel locations.

It will be appreciated that cooling lines, air conditioner fluid lines, etc., need to span from the mid-engine location behind the passenger compartment to the front-end locations of the heat exchangers utilized in the dual outboard system.

These cooling and air conditioning fluid lines can run through the single member torsional box from the mid-engine location to the front-end location and back again through the single member torsional box to the mid-engine location.

Chassis systems, steering, suspension, balanced to allow non eccentricity in a vertical plane.

The single member torsional box spans a center portion of the passenger compartment. As a result, a height of the single member torsional box may be dictated or impacted by seating height position and occupant ergonomics. Similarly, a width of the single member torsional box may be dictated or impacted by cross car seating position driven by occupant parameters The single member torsional box is preferably a closed cross-section structure, for example, with a rectangular, quadrilateral, or other closed geometrical cross section, which can act as a column in a horizontal orientation or set on its side. If the cross-section were instead open or U-shaped, a crush strength of the single member torsional box would be lessened. The single member torsional box may be a single or constant cross section along its longitudinal length, maximizing strength of the single member torsional box in transferring force in a longitudinal in-vehicle orientation by avoiding weak points that would be caused by necking or substantially thinning the single member torsional box. The complete closed cross section of the single member torsional box may, in one embodiment, be created by forming an upside-down U-shaped upper portion and adding a "close-out" panel or bottom portion to complete a rectangular cross-section. The upside-down U-shaped upper portion of the single member torsional box may be constructed through extrusion constructed with two continuous full length closed sections.

Figure 1:
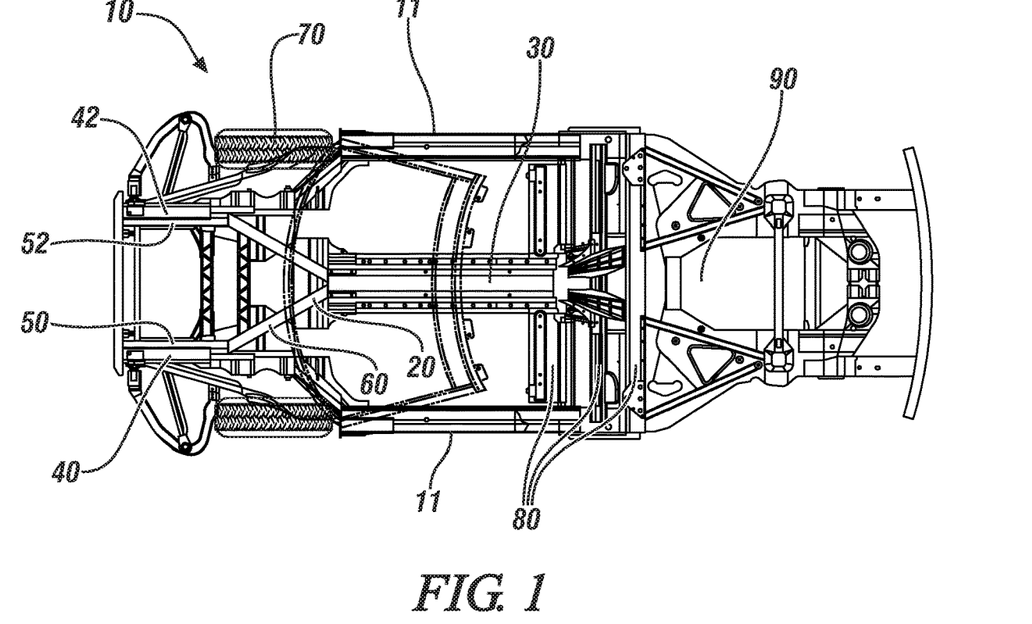
FIG. 1 illustrates in top view an exemplary vehicle body for a convertible mid-engine automobile, including a close coupled four rail front crush structure system, in accordance with the present disclosure.

FIG. 1 illustrates in top view an exemplary vehicle body for a convertible mid-engine automobile, including a close coupled four rail front crush structure system. Vehicle body 10 is illustrated including front crush structure system 20 connected to rearward body components 80. Vehicle body 10 further includes engine area 90. Front crush structure system 20 includes four rails including driver-side upper rail 40, passenger-side upper rail 42, driver-side lower rail 50, and passenger-side lower rail 52; diagonal support members 60; and single member torsional box 30. Each of driver-side upper rail 40, passenger-side upper rail 42, driver-side lower rail 50, and passenger-side lower rail 52 are parallel to a longitudinal axis of vehicle body 10, such that an external force applied to a front of vehicle body 10 can be transmitted through driver-side upper rail 40, passenger-side upper rail 42, driver-side lower rail 50, and passenger-side lower rail 52 in a vehicle rearward direction. Each of driver-side upper rail 40, passenger-side upper rail 42, driver-side lower rail 50, and passenger-side lower rail 52 can be constructed of low strength aluminum, such that the rails can crush and absorb force.

Single member torsional box 30 is illustrated in a central portion of vehicle body 10 corresponding to a passenger compartment of vehicle body 10. Diagonal support members 60 are illustrated, one connected to each of driver-side upper rail 40, passenger-side upper rail 42, driver-side lower rail 50, and passenger-side lower rail 52, and each diagonal support member 60 being attached to a corner of single member torsional box 30.

Wheels 70 are illustrated. It will be appreciated that wheels 70 are inset within vehicle body 10 and prevent direct connection of driver-side upper rail 40, passenger-side upper rail 42, driver-side lower rail 50, and passenger-side lower rail 52 to vehicle body side members 11 with a straight structural member.

Figure 2:
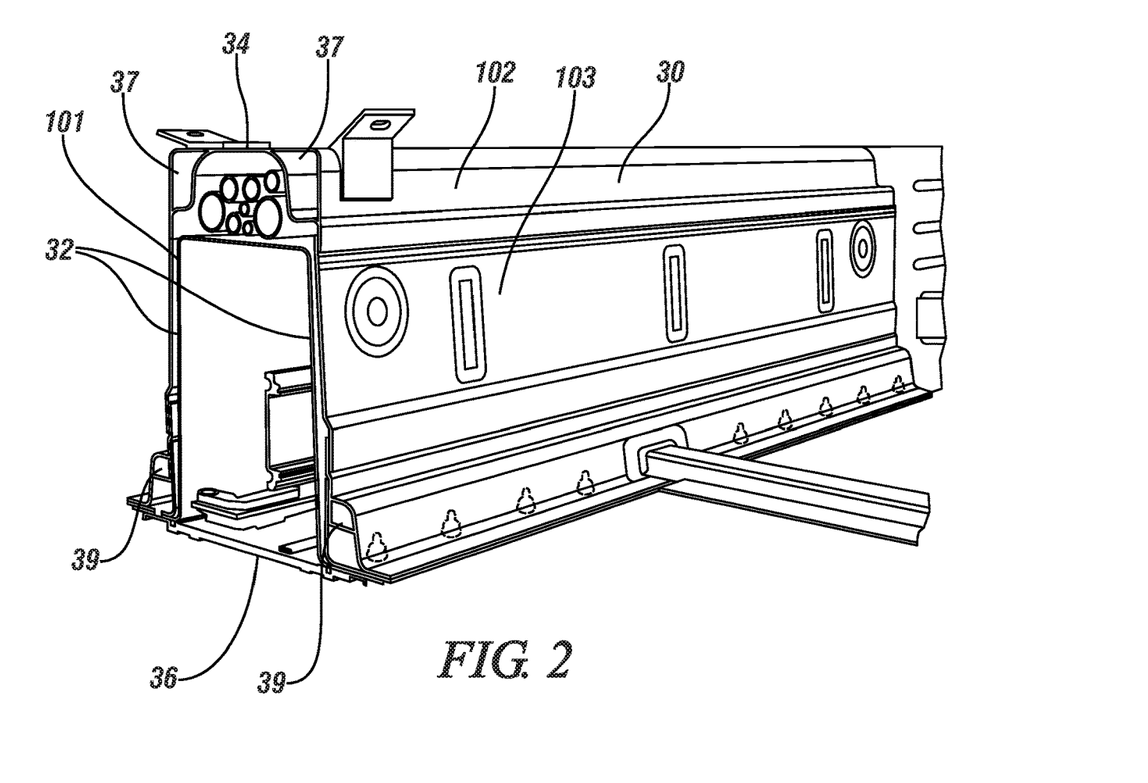
FIG. 2 illustrates in perspective view the single member torsional box of FIG. 1, in accordance with the present disclosure.

FIG. 2 illustrates in perspective view the single member torsional box of FIG. 1. Single member torsional box 30 is illustrated with a substantially rectangular cross-section including a top wall 34, two side walls 32, and a bottom panel 36. The rectangular cross-section is a closed shape, such that single member torsional box 30 can efficiently transfer force from diagonal support members 60 to rearward body components 80. Additionally, single member torsional box 30 is reinforced with four extruded or elongated enclosed sections running along an entire length of the box, namely, enclosed sections 37 on the top corners and enclosed sections 39 on the bottom corners, to add torsional rigidity to the single member torsional box 30, thereby imparting torsional strength to vehicle body 10.

Single member torsional box 30 can be a composite structure, including a plurality of pieces attached together to make up the overall single member. Single member torsional box 30 includes a central upside-down U-shaped portion 101, an upper upside-down U-shaped portion 102, two side plates 103, and bottom panel 36. Bottom panel 36 is attached to the rest of single member torsional box 30 with a plurality of fasteners attaching bottom panel 36 to single member torsional box 30. Single member torsional box 30 may include embedded or welded on clinch nuts configured to receive threaded fasteners to attach bottom panel 36 to the box.

Figure 3:
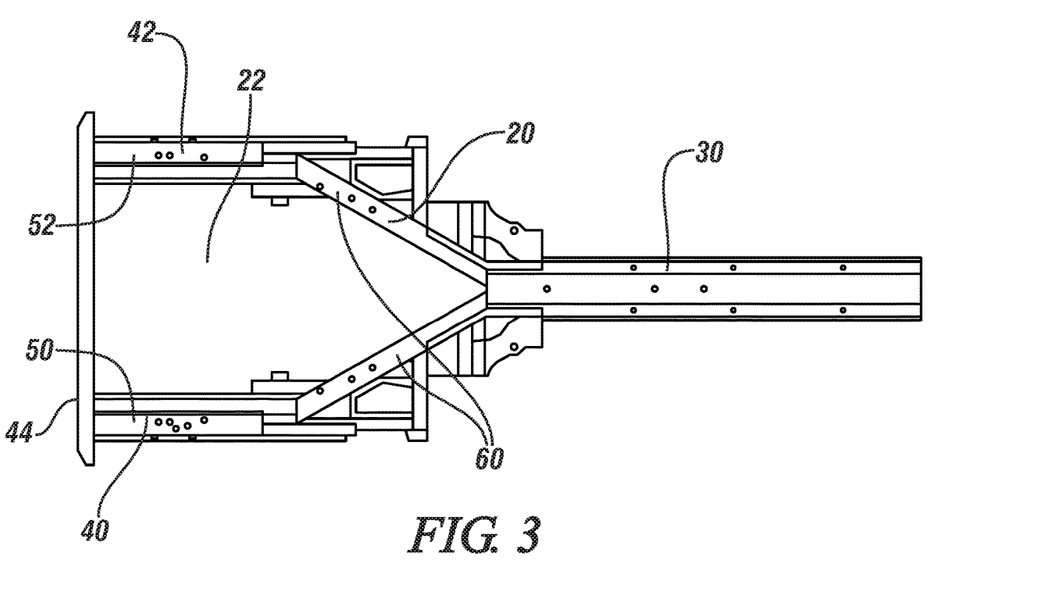
FIG. 3 illustrates in top view the close coupled four rail front crush structure system of FIG. 1, in accordance with the present disclosure.

FIG. 3 illustrates in top view the front crush structure system of FIG. 1. Front crush structure system 20 is illustrated including four rails including driver-side upper rail 40, passenger-side upper rail 42, driver-side lower rail 50, and passenger-side lower rail 52; diagonal support members 60; and single member torsional box 30. A horizontal member 44 is illustrated connecting driver-side upper rail 40 to passenger-side upper rail 42. Horizontal member 44 can be configured to receive a force and transmit that force to each of the connected rails.

By spacing out the driver-side and passenger side rails, force can be transmitted from across a wide front surface of the vehicle. If a single central rail were used, force applied to either side of the central rail could not be efficiently transferred. Additionally, by spacing out the driver-side and passenger side rails, a space 22 between the rails can be preserved, thereby preserving a cargo carrying capability for the vehicle body.

Figure 4:
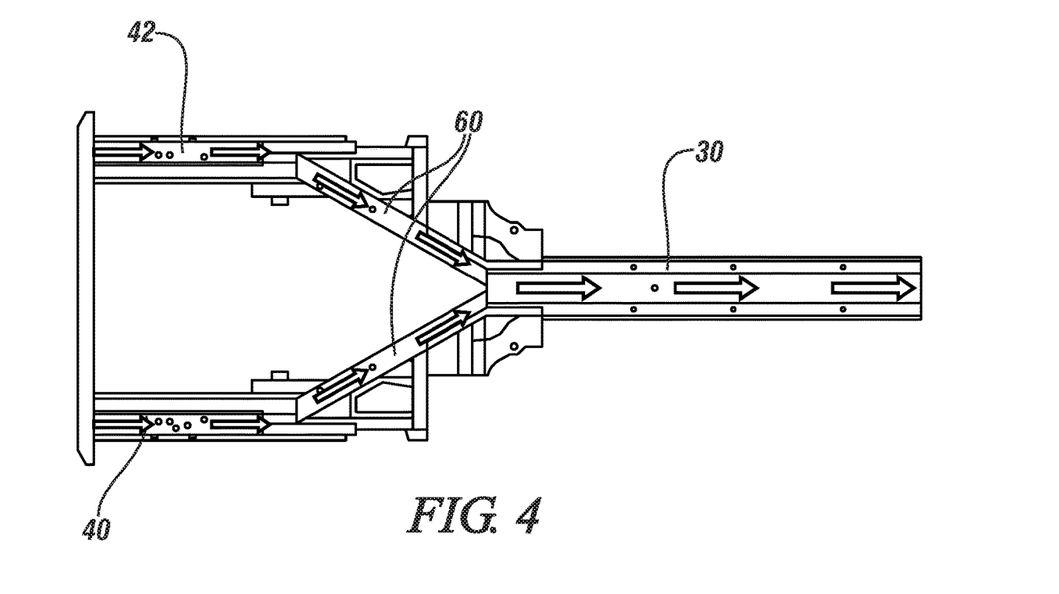
FIG. 4 illustrates the close coupled four rail front crush structure system of FIG. 3 with illustrative arrows showing exemplary force distribution through the members of the close coupled four rail front crush structure system, in accordance with the present disclosure.

FIG. 4 illustrates the front crush structure system of FIG. 3 with illustrative arrows showing exemplary force distribution through the members of the close coupled four rail front crush structure system. Single member torsional box 30, diagonal support members 60, and driver-side upper rail 40 and passenger-side upper rail 42 are illustrated. A frontal force is illustrated being transmitted through each of driver-side upper rail 40 and passenger-side upper rail 42.

Driver-side upper rail 40 and passenger-side upper rail 42 are illustrated substantially parallel to a longitudinal axis of the vehicle body. Diagonal support members 60 are each illustrated angled approximately 30 degrees in relation to driver-side upper rail 40 and passenger-side upper rail 42, respectively. Similarly, diagonal support member 60 are illustrated angled approximately 30 degrees in relation to single member torsional box 30. In an ideal situation, from a standpoint of efficient force transmission, one would want force to be transmitted through an ideal column that was perfectly in line from one end to another. However, for reasons of needing to transmit force across a wide front of the vehicle, cost, weight, cargo room, and other important considerations, driver-side upper rail 40 and passenger-side upper rail 42 need to be offset from single member torsional box 30. By maintaining a relatively small angle between driver-side upper rail 40 and passenger-side upper rail 42 and diagonal support members 60 and between diagonal support members 60 and single member torsional box 30, a majority of the force applied to driver-side upper rail 40 and passenger-side upper rail 42 can be transmitted efficiently to and through single member torsional box 30. An analysis of force vectors can be used to approximate that 86% of force applied to driver-side upper rail 40 is transferred to the connected diagonal support member 60, and similarly, approximately 86% of the force applied to diagonal support member 60 is transferred to the connected single member torsional box 30. It will be appreciated that a similar illustration from a bottom view showing force transmission through the lower rail members and the attached diagonal support members could be shown, and the illustrative arrows showing force transmission would be substantially the same as the arrows of FIG. 4.

Figure 5:
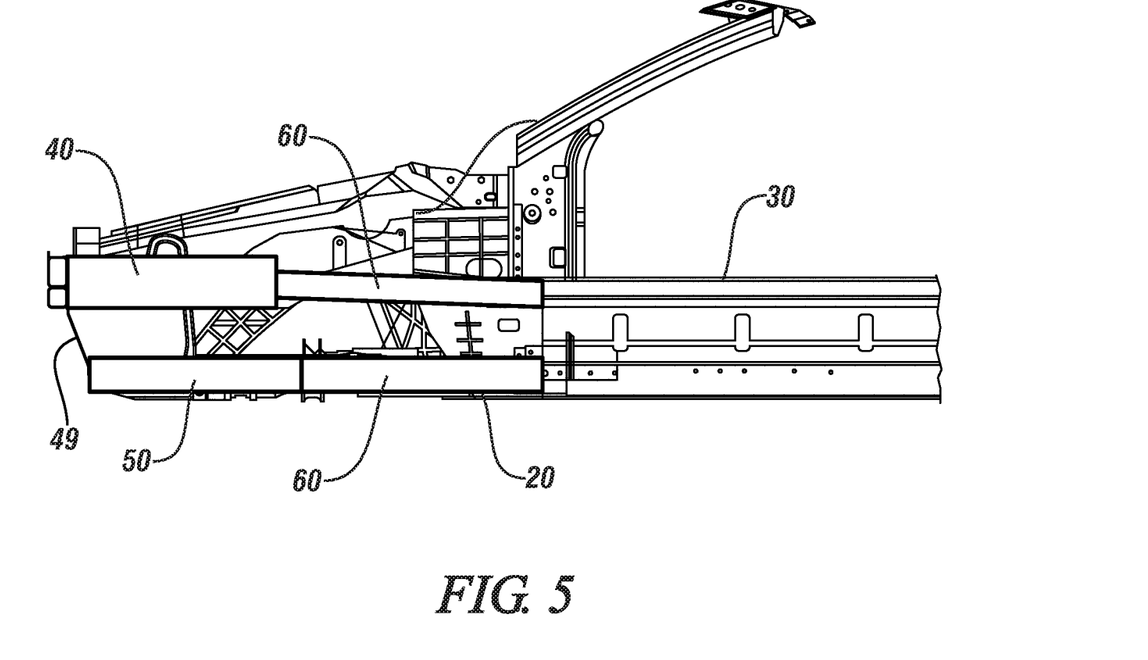
FIG. 5 illustrates in side view the close coupled four rail front crush structure system of FIG. 1, in accordance with the present disclosure.
Figure 6:
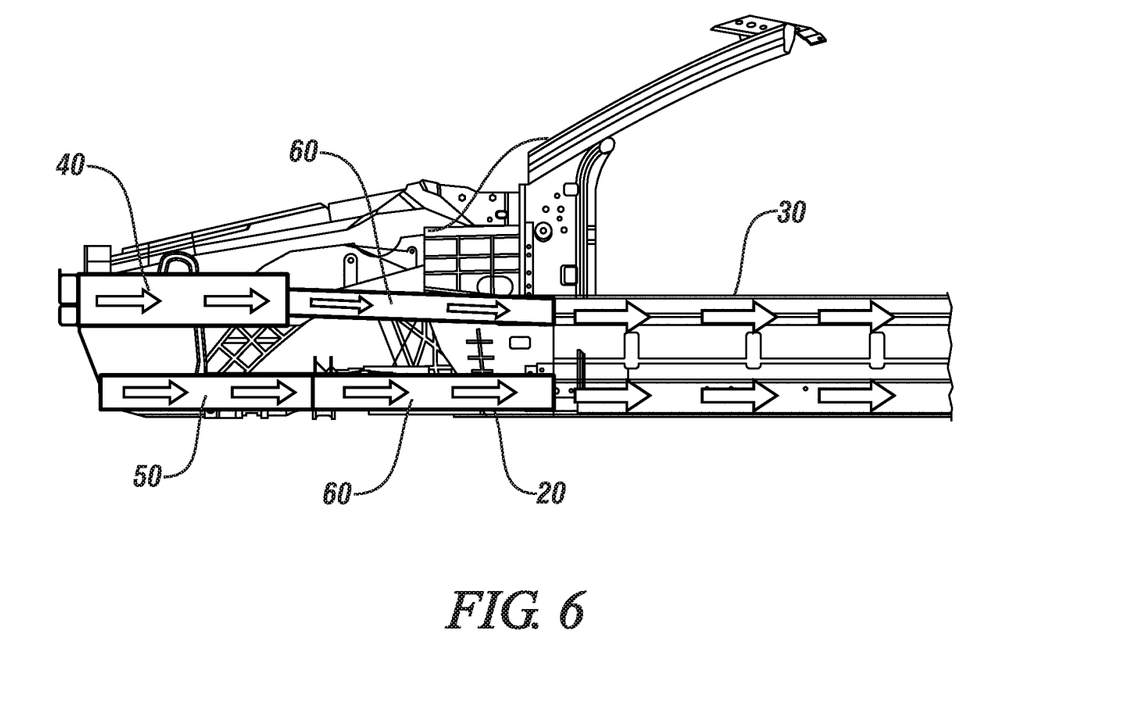
FIG. 6 illustrates the close coupled four rail front crush structure system of FIG. 5 with illustrative arrows showing exemplary force distribution through the members of the close coupled four rail front crush structure system, in accordance with the present disclosure.

FIG. 5 illustrates in side view the close coupled four rail front crush structure system of FIG. 1. Front crush structure system 20 is illustrated including driver-side upper rail 40, driver-side lower rail 50, diagonal support members 60, and single member torsional box 30. In one embodiment, driver-side upper rail 40, driver-side lower rail 50 can be die cast parts with complex shapes, for example, including attachment features for holding the rails in place within the vehicle body. Diagonal support members 60 can include tubular, extruded members which are inset, held within, or otherwise fastened to other parts. The components of front crush structure system 20 are illustrated in simplified blocks for clarity sake, showing force transmitting members as blocks to provide an understanding of how they are configured to transfer force. However, their actual appearance in the vehicle can vary from the illustrations provided herein. FIG. 6 illustrates the close coupled four rail front crush structure system of FIG. 5 with illustrative arrows showing exemplary force distribution through the members of the close coupled four rail front crush structure system. Front crush structure system 20 is illustrated including driver-side upper rail 40, driver-side lower rail 50, diagonal support members 60, and single member torsional box 30. By maintaining a relatively small angle between driver-side upper rail 40 and driver-side lower rail 50 and respective diagonal support members 60 and between diagonal support members 60 and single member torsional box 30, a majority of the force applied to driver-side upper rail 40 and driver-side lower rail 50 can be transmitted efficiently to and through single member torsional box 30. FIGS. 5 and 6 are illustrated from a driver-side view of the vehicle body. It will be appreciated that a similar illustration from a passenger-side view showing force transmission through the passenger-side rail members and the attached diagonal support members could be shown, and the illustrative arrows showing force transmission would be substantially the same as the arrows of FIG. 6. Front crush structure system 20 can include one or more vertical braces 49, such that force applied to either the top rails or the bottom rails is distributed to the other rails.

Figure 7:
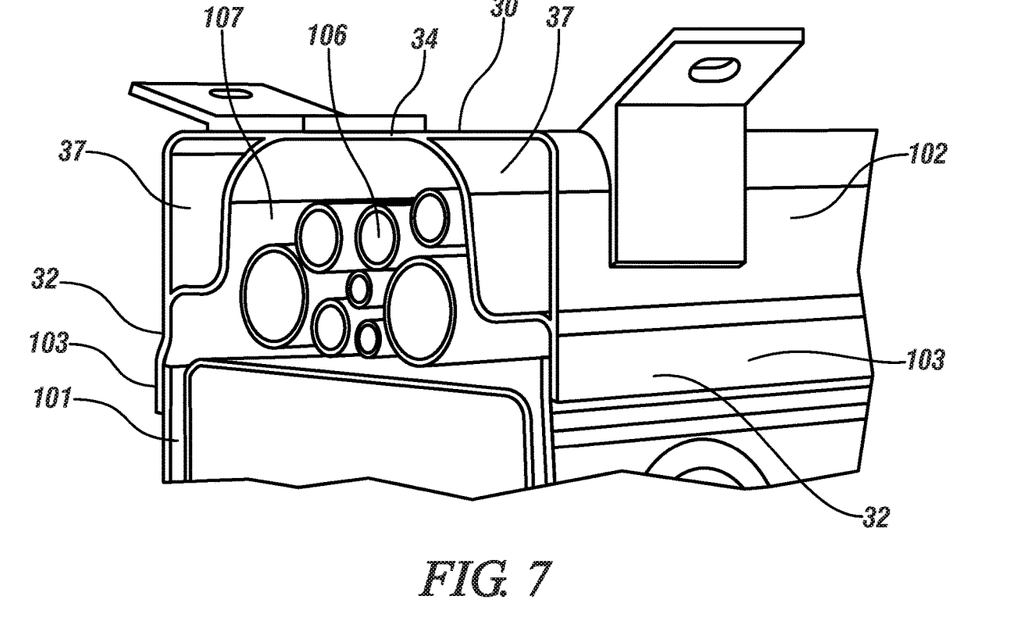
FIG. 7 illustrates a top portion of the single member torsional box of FIG. 2 in detail, in accordance with the present disclosure.

FIG. 7 illustrates a top portion of the single member torsional box of FIG. 2 in detail. Single member torsional box 30 is illustrated including a top wall 34, two side walls 32, and enclosed sections 37. Central upside-down U-shaped portion 101, upper upside-down U-shaped portion 102, two side plates 103 are illustrated forming the composite structure of the single member torsional box 30. Coolant lines 106 are illustrated positioned within a central cavity of single member torsional box 30.

Figure 8:
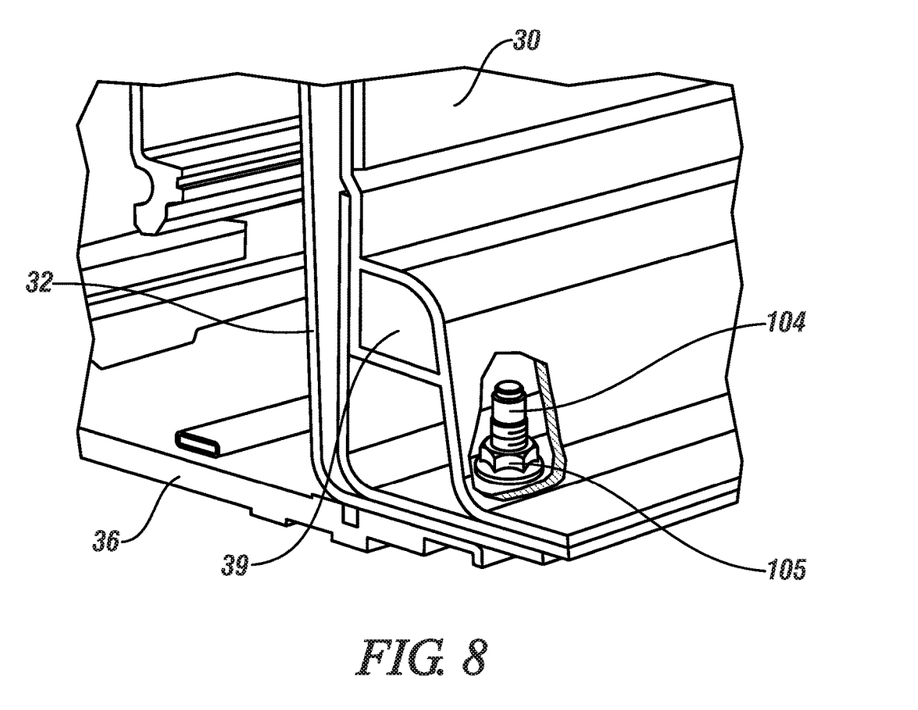
FIG. 8 illustrates a bottom portion of the single member torsional box of FIG. 2 in detail, in accordance with the present disclosure.

FIG. 8 illustrates a bottom portion of the single member torsional box of FIG. 2 in detail. Single member torsional box 30 is illustrated including a side wall 32, bottom panel 36, enclosed section 39, and a fastener 104 being attached to a clinch nut 105 attached to single member torsional box 30.

While the best modes for carrying out the disclosure have been described in detail, those familiar with the art to which this disclosure relates will recognize various alternative designs and embodiments for practicing the disclosure within the scope of the appended claims.

What is claimed is:

1. A system for providing structural transmittal of force through a vehicle body of a mid-engine vehicle, comprising:
    an elongated single member torsional box spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body;
    four rails in a vehicle-forward position relative to the elongated single member torsional box, parallel to the longitudinal axis of the vehicle body, and offset from the elongated single member torsional box; and
    four diagonal support members, each diagonal support member being connected at a respective first end to a respective one of the four rails and at a respective second end to the elongated single member torsional box.

2. The system of claim 1, wherein the four rails are each constructed with a relatively low strength aluminum; and
    wherein the four diagonal support members are each constructed with a relatively high strength aluminum.

3. The system of claim 1, wherein the elongated single member torsional box comprises a constant cross section along a longitudinal axis of the elongated single member torsional box.

4. The system of claim 1, wherein the diagonal support members are each oriented thirty degrees from the longitudinal axis of the vehicle body.

5. The system of claim 1, wherein the elongated single member torsional box comprises four corners; and
    wherein the diagonal support members are each connected at the respective second end to a respective one of the corners of the elongated single member torsional box.

6. The system of claim 5, wherein each of the corners of the elongated single member elongated box comprises a respective elongated enclosed section running along an entire length of the elongated single member torsional box.

7. The system of claim 1, wherein the elongated single member torsional box comprises a closed polygonal cross-section.

8. The system of claim 7, wherein the closed polygonal cross-section comprises a rectangle cross-section.

9. The system of claim 8, wherein a bottom surface of the elongated single member torsional box comprises a removable panel.

10. The system of claim 9, wherein the elongated single member torsional box comprises a plurality of integrated clinch nuts configured to enable the removable panel to be attached to other components of the elongated single member torsional box.

11. The system of claim 1, wherein the elongated single member torsional box comprises cooling lines extending through the elongated single member torsional box.

12. A system for providing structural transmittal of force through a vehicle body of a mid-engine vehicle, comprising:
    an elongated single member torsional box comprising a closed rectangular cross-section and four corners, each corner comprising a respective elongated enclosed section running along an entire length of the elongated single member torsional box, the elongated single member torsional box spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body;
    four rails in a vehicle-forward position relative to the elongated single member torsional box, parallel to the longitudinal axis of the vehicle body, and offset from the elongated single member torsional box; and
    four diagonal support members, each diagonal support member being connected at a respective first end to a respective one of the four rails and at a respective second end to a respective one of the four corners of the elongated single member torsional box.

13. The system of claim 12, wherein the four rails are each constructed with a relatively low strength aluminum; and
    wherein the four diagonal support members are each constructed with a relatively high strength aluminum.

14. The system of claim 12, wherein the elongated single member torsional box comprises a constant cross section along a longitudinal axis of the elongated single member torsional box.

15. The system of claim 12, wherein the diagonal support members are each oriented thirty degrees from the longitudinal axis of the vehicle body.

16. A method for providing structural transmittal of a frontal force through a vehicle body of a mid-engine vehicle, comprising:
    receiving the frontal force to four rails in a vehicle-forward position, the rails being oriented parallel to a longitudinal axis of the vehicle body;
    transmitting the frontal force from the four rails to four diagonal support members, each located in a vehicle rearward position relative to the four rails, each diagonal support member being connected at a respective first end to a respective one of the four rails and at a respective second end to an elongated single member torsional box; and
    transmitting the frontal force from the four diagonal support members to the elongated single member torsional box located in a vehicle rearward position relative to the four diagonal support members, the elongated single member torsional box spanning a passenger compartment from a vehicle-forward portion of the passenger compartment to a vehicle-rearward portion of the passenger compartment and being parallel to the longitudinal axis of the vehicle body and laterally centered upon a longitudinal centerline of the vehicle body.

* * * * *